US012662161B2

(12) United States Patent
Suto et al.

(10) Patent No.: US 12,662,161 B2
(45) Date of Patent: Jun. 23, 2026

(54) EXTERNAL DATA COLLECTION BASED ON PREDICTED DATA INSUFFICIENCY

(71) Applicant: International Business Machines Corporation, Armonk, NY (US)

(72) Inventors: Tiberiu Suto, Franklin, NY (US); Martin G. Keen, Cary, NC (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 18/065,114

(22) Filed: Dec. 13, 2022

(65) Prior Publication Data

US 2024/0190469 A1 Jun. 13, 2024

(51) Int. Cl.
*B60W 60/00* (2020.01)
*B60W 50/00* (2006.01)

(52) U.S. Cl.
CPC .... *B60W 60/0015* (2020.02); *B60W 50/0097* (2013.01); *B60W 2420/408* (2024.01); *B60W 2556/10* (2020.02); *B60W 2556/65* (2020.02)

(58) Field of Classification Search
CPC ......... B60W 60/0015; B60W 50/0097; B60W 2420/408; B60W 2556/10; B60W 2556/65; G05D 1/249; G05D 1/857; G05D 1/86; G05D 2105/20; G05D 2107/13; G05D 2109/10
See application file for complete search history.

(56) References Cited

U.S. PATENT DOCUMENTS

| | | | |
|---|---|---|---|
| 6,882,930 | B2 | 4/2005 | Trayford et al. |
| 7,706,965 | B2 | 4/2010 | Downs et al. |
| 8,755,991 | B2 | 6/2014 | Wynter et al. |
| 9,599,989 | B1 | 3/2017 | Brown |
| 10,884,885 | B2 | 1/2021 | Anders et al. |
| 11,119,477 | B1 | 9/2021 | Konrardy et al. |
| 2017/0192437 | A1* | 7/2017 | Bier ..................... G05D 1/0278 |
| 2018/0089622 | A1* | 3/2018 | Burch, V ........... G06Q 10/0833 |
| 2019/0051180 | A1* | 2/2019 | Vaughn .................. G08G 1/163 |
| 2021/0233406 | A1* | 7/2021 | Lu .......................... G08G 1/161 |
| 2021/0407284 | A1 | 12/2021 | Li et al. |

(Continued)

FOREIGN PATENT DOCUMENTS

| | | |
|---|---|---|
| CN | 105632193 B | 6/2016 |
| CN | 108700881 A | 10/2018 |

(Continued)

*Primary Examiner* — Anne Marie Antonucci
*Assistant Examiner* — Luis G Del Valle
(74) *Attorney, Agent, or Firm* — Anthony M. Pallone

(57) ABSTRACT

Provided is a computer-implemented method, system, and computer program product for predicting data insufficiency related to performing autonomous vehicle actions and dynamically mitigating the data insufficiency by collecting external data from additional data sources. A processor may direct, for an autonomous vehicle, an action in response to external data. The processor may collect contextual data about an environment in which the autonomous vehicle is operating. The processor may predict, based in part on the collected contextual data, an insufficiency of external data for performing the action. In response to the predicting, the processor may direct collection of additional external data from a second data source.

14 Claims, 5 Drawing Sheets

(56) References Cited

U.S. PATENT DOCUMENTS

| 2022/0292543 | A1* | 9/2022 | Henderson | ......... G06Q 30/0252 |
| 2022/0417117 | A1* | 12/2022 | Tayeb | ..................... H04L 41/28 |
| 2023/0073151 | A1* | 3/2023 | Ucar | .................... B60W 50/14 |

FOREIGN PATENT DOCUMENTS

| CN | 113470365 | B | 10/2021 |
| CN | 114613145 | A | 6/2022 |

* cited by examiner

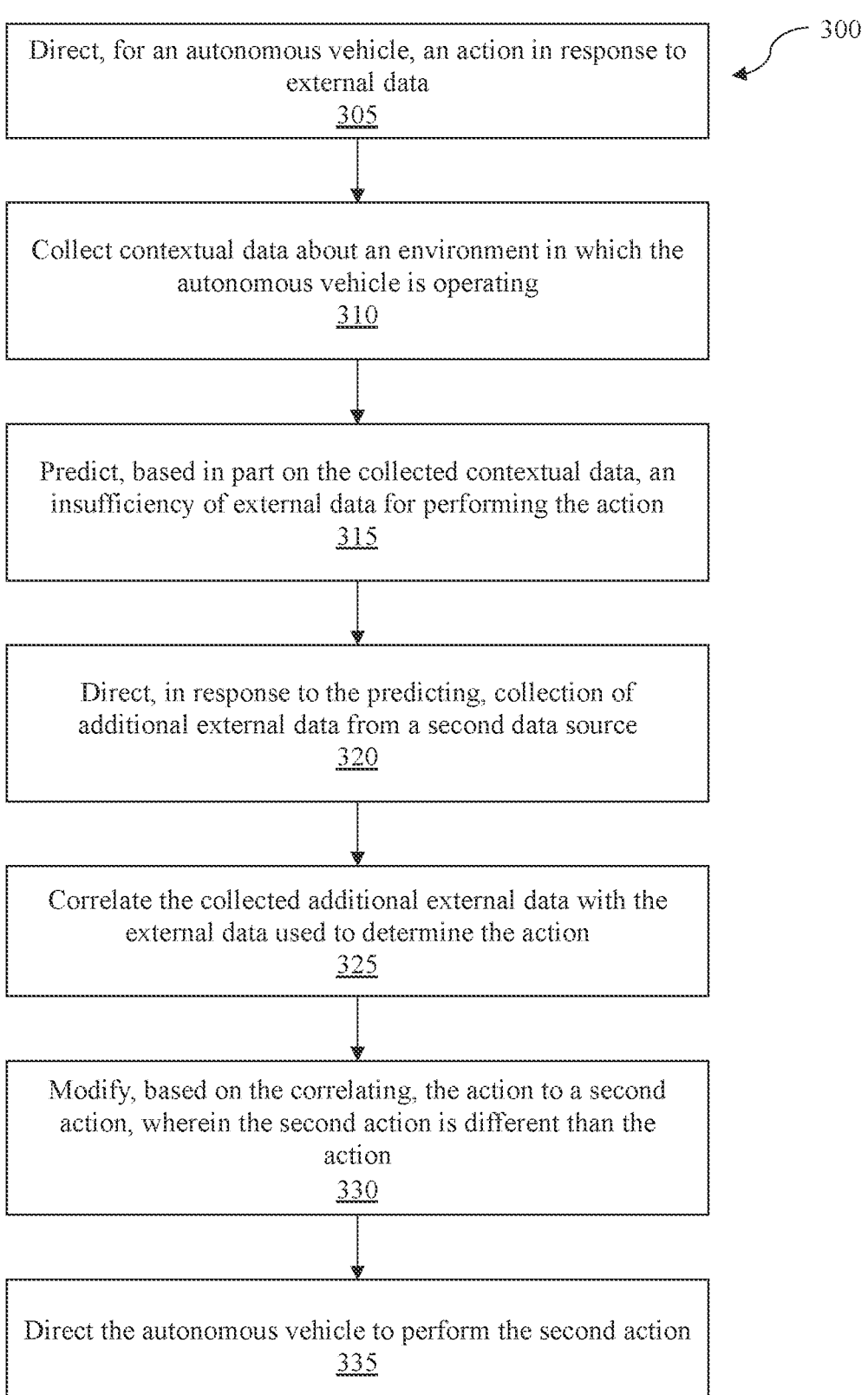

Direct, for an autonomous vehicle, an action in response to external data
305

Collect contextual data about an environment in which the autonomous vehicle is operating
310

Predict, based in part on the collected contextual data, an insufficiency of external data for performing the action
315

Direct, in response to the predicting, collection of additional external data from a second data source
320

Correlate the collected additional external data with the external data used to determine the action
325

Modify, based on the correlating, the action to a second action, wherein the second action is different than the action
330

Direct the autonomous vehicle to perform the second action
335

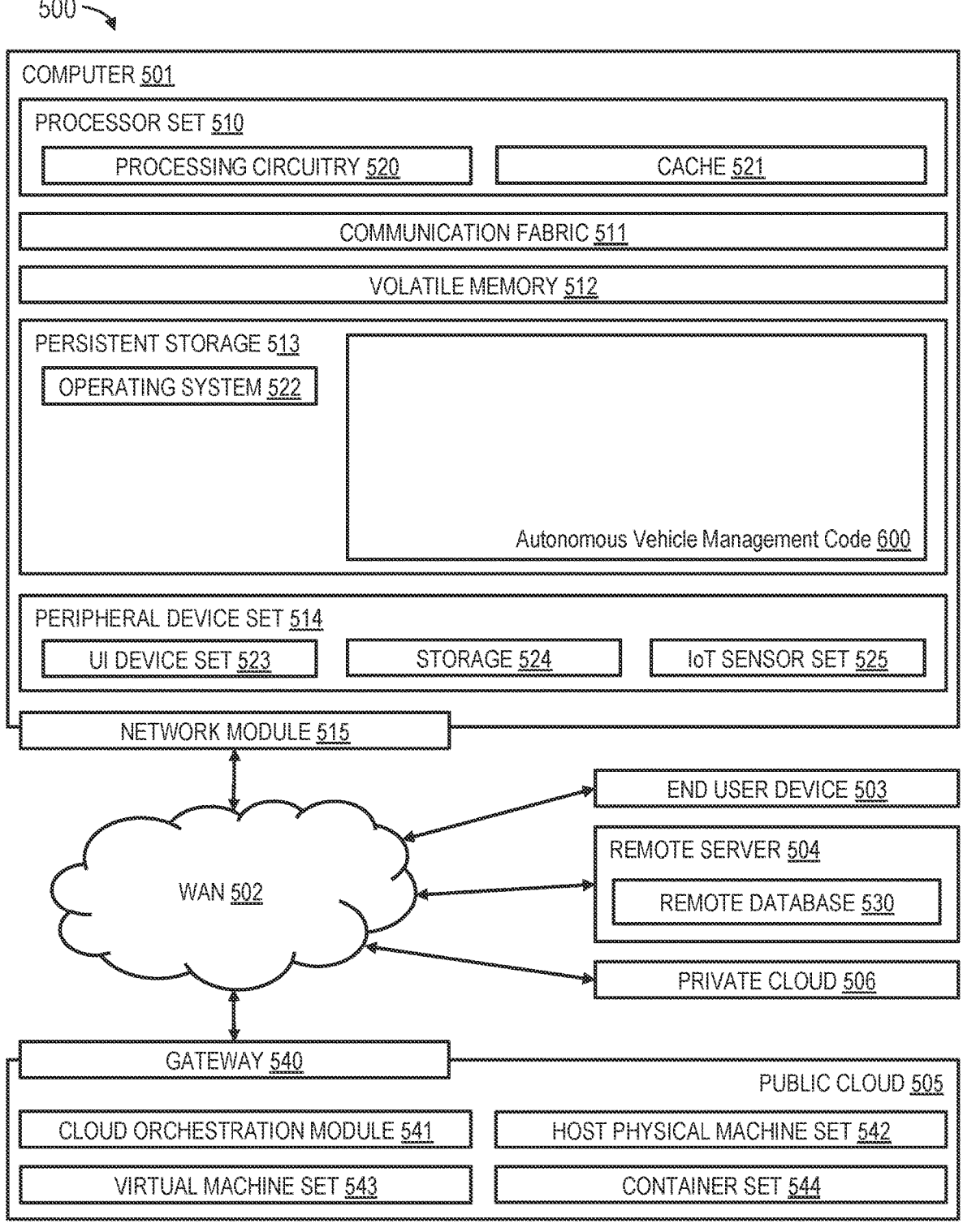

COMPUTER 501

PROCESSOR SET 510

PROCESSING CIRCUITRY 520          CACHE 521

COMMUNICATION FABRIC 511

VOLATILE MEMORY 512

PERSISTENT STORAGE 513

OPERATING SYSTEM 522

Autonomous Vehicle Management Code 600

PERIPHERAL DEVICE SET 514

UI DEVICE SET 523          STORAGE 524          IoT SENSOR SET 525

NETWORK MODULE 515

WAN 502

END USER DEVICE 503

REMOTE SERVER 504

REMOTE DATABASE 530

PRIVATE CLOUD 506

GATEWAY 540

PUBLIC CLOUD 505

CLOUD ORCHESTRATION MODULE 541          HOST PHYSICAL MACHINE SET 542

VIRTUAL MACHINE SET 543          CONTAINER SET 544

FIG. 5

EXTERNAL DATA COLLECTION BASED ON PREDICTED DATA INSUFFICIENCY

BACKGROUND

The present disclosure relates generally to the field of autonomous vehicles and, more specifically, to predicting data insufficiency related to performing autonomous vehicle actions and dynamically mitigating the data insufficiency by collecting external data from additional data sources.

Autonomous vehicles use an array of different types of sensors to make driving decisions within an environment or surrounding. In many instances, the sensors may include potentially varying quality and accuracy specifications across models and brands. Autonomous vehicles gather various sets (types) of data from these sensors every single second. It is estimated that the average autonomous vehicle processes approximately 4 Terabytes (TBs) of sensor data per day.

SUMMARY

Embodiments of the present disclosure include a computer-implemented method, system, and computer program product for predicting data insufficiency related to performing autonomous vehicle actions and dynamically mitigating the data insufficiency by collecting external data from additional data sources. A processor may direct, for an autonomous vehicle, an action in response to external data. The processor may collect contextual data about an environment in which the autonomous vehicle is operating. The processor may predict, based in part on the collected contextual data, an insufficiency of external data for performing the action. In response to the predicting, the processor may direct collection of additional external data from a second data source.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3 illustrates an example process for predicting data insufficiency related to performing an action and dynamically mitigating the data insufficiency by collecting external data from a second data source, in accordance with some embodiments of the present disclosure.

FIG. 5 depicts a schematic diagram of a computing environment for executing program code related to the methods disclosed herein and for autonomous vehicle management, according to at least one embodiment.

Figure 1:
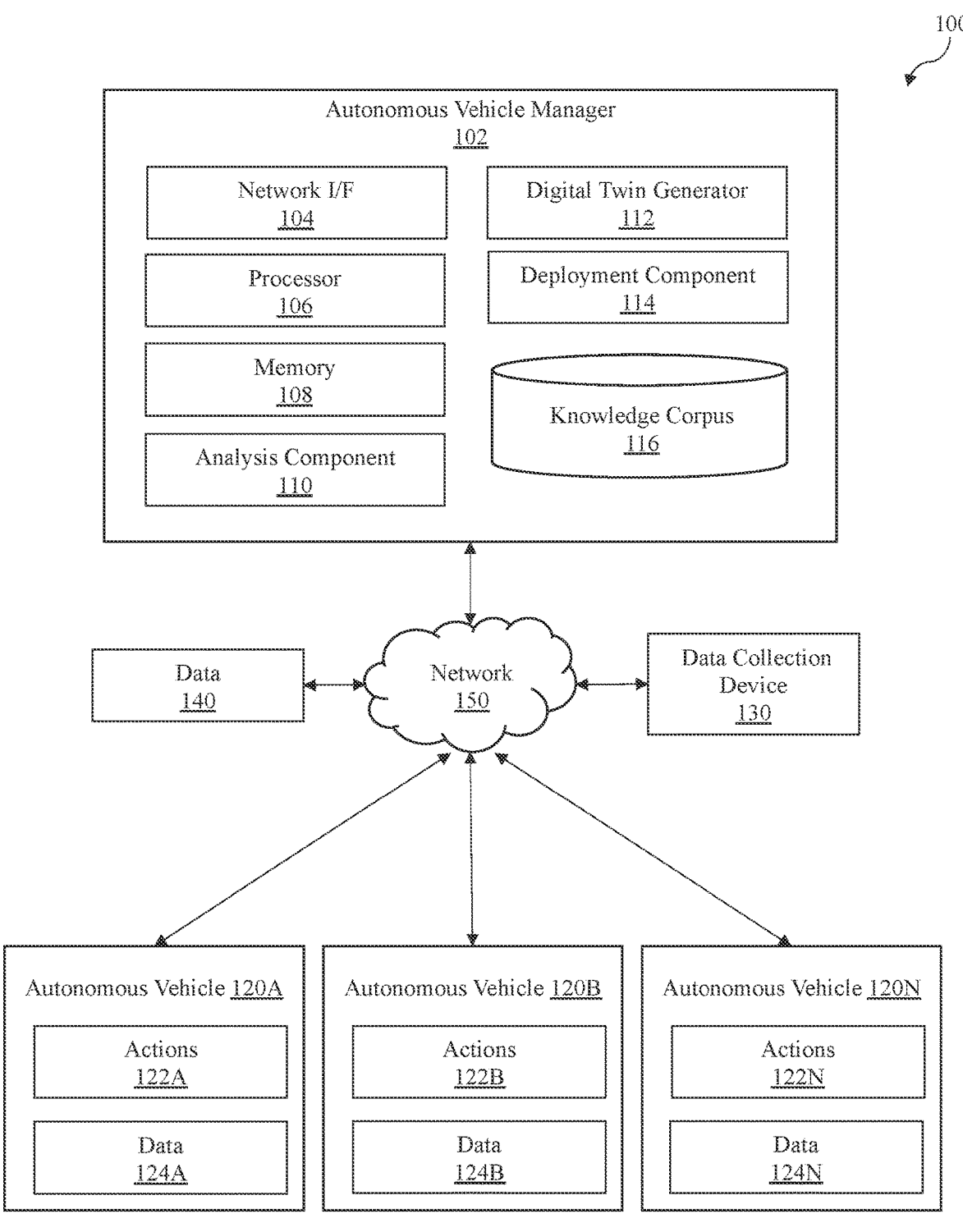
FIG. 1 illustrates an example autonomous vehicle management system, in accordance with some embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of autonomous vehicles and, more particularly, to predicting data insufficiency related to performing autonomous vehicle actions and dynamically mitigating the data insufficiency by collecting external data from additional data sources. While the present disclosure is not necessarily limited to such applications, various aspects of the disclosure may be appreciated through a discussion of various examples using this context.

Autonomous vehicles use an array of different types of sensors to make driving decisions within an environment or surrounding. In many instances, the sensors may include potentially varying quality and accuracy specifications across models and brands. Autonomous vehicles gather various sets (types) of data from these sensors every single second. It is estimated that the average autonomous vehicle processes approximately 4 Terabytes (TBs) of sensor data per day. To perform a complete analysis of the data, it is necessary to obtain complete sets of input data in order to generate accurate results. If any data is missing or affected by anomalies, there can be significant deviation affecting the result. Making decisions based on such incomplete data can lead to increased risk especially in a critical autonomous vehicle self-driving scenario.

For example, in an active driving scenario when autonomous vehicles are running extremely fast (e.g., upwards of 70 mph), quick decisions/driving actions are mandatory, which in turn require complete and accurate data to provide optimal driving results. If an autonomous vehicle is unable to capture all relevant information and/or contextual data from the current surrounding, the autonomous vehicle may be required to reduce speed in an inefficient manner in order to make driving decisions using limited data. In many instances, driving decisions made with insufficient data can result in traffic congestion or the autonomous vehicle may make a poor driving decision that may potentially cause an accident.

Embodiments of the present disclosure include a system, computer-implemented method, and computer program product that are configured to predict data insufficiency related to performing autonomous vehicle actions in a safe manner and dynamically mitigate the data insufficiency by collecting external data from additional data sources.

In embodiments, the system is configured to perform a contextual situational awareness analysis for identifying missing or insufficient data for performing various actions related to the autonomous vehicle. For example, based on any defined contextual situation, the system will identify if the autonomous vehicles running on a roadway/surface/air trajectory will be able to capture required input data for making automated decisions related to vehicle actions. If the system determines that there is insufficient data to determine an appropriate vehicle action, then the system will proactively deploy external input data gathering devices/modules in the given environmental situation, so that autonomous vehicle can gather complete data for the identified contextual situation.

For example, an autonomous vehicle requiring the use of computer vision assistance technology may be affected by smoke from a nearby wildfire that has reduced visibility on a highway. Therefore, the vision-based autonomous driving system may be inhibited from making accurate driving decisions when the smoke obscures its view of the road. In response to the derived data insufficiency, an autonomous data collection device (e.g., unmanned ariel vehicle (UAV), mobile sensor, smart station, etc.) may be dispatched to the area and equipped with laser imaging detection and ranging (LIDAR) sensors to gather data that the autonomous vehicle is unable to collect. The LIDAR sensor output data may be sent to the autonomous vehicles over a temporal network to augment visualization capabilities of the road ahead. In this way, the predicted data insufficiency is mitigated with the collected LIDAR sensor output, such that a more accurate driving action/decision may be made by the autonomous vehicle.

In embodiments, the system may utilize a digital twin of the autonomous vehicle to determine if there is insufficient data for safely performing vehicle/driving actions. For example, the system may analyze a digital twin simulation of the autonomous vehicle to identify the time required (effectiveness) for the vehicle to apply various driving decisions or actions (e.g., based on weather conditions where braking for the vehicle may be limited, so the driving action must be performed sooner, or unseen obstacles that may be present further down the roadway). If more contextual and/or external data is needed to make an informed vehicle action/driving decision, then the system is configured to identify the appropriate locations around the road where external data gathering devices/modules can be deployed so that the vehicles can perform proactive data analysis.

For example, an autonomous bus may be travelling on a route that includes a section of road that is under construction. To perform safe driving actions, the autonomous bus may need to identify the location of unseen workers and/or construction vehicles within the roadway so that it can plan its route around them efficiently and in a safe manner. In response to the derived data insufficiency, a worker with a mobile device may broadcast their location over a short-range network to the autonomous bus. Using the worker's location, the autonomous vehicle may modify vehicle actions based on this data that avoid the area or location of the worker. In this way, the data insufficiency is mitigated by using additional data from the worker's mobile device.

In some embodiments, the system may deploy or direct various data collection devices/modules to collect various data based on the identified contextual situation. For example, the system may collect data from various collection modules or devices that are disposed along a travel route in order to gather additional external input data (e.g., road conditions, air conditions, visibility, weather, light, etc.). This additional data may be utilized by the autonomous vehicle(s) to augment data for determining driving decisions.

In some embodiments, the system may direct autonomous vehicle traffic reconfiguration based on the collection of additional data. For example, on any road, there may be different types of autonomous vehicles traveling that have different combinations of data collection and analysis capabilities. In embodiments, the system may command the autonomous vehicles to rearrange their driving configuration such that any external data gathering devices/modules can be used in an optimum manner (e.g., rearranging vehicles that have different/higher quality sensors to gather and share data). For example, the system may identify the number of autonomous vehicles that are running on the road, capabilities of the vehicles to gather input data, and determine if the external data collection modules are to be attached with any of the given vehicles or may require additional data collection devices to be placed in the surrounding. This allows autonomous vehicles with limited data capabilities to gather additional data for making better driving decisions.

In some embodiments, the system may determine whether permanent data collection devices/modules are required for safe operation of autonomous vehicles. For example, based on the identified contextual scenario, types of input data to be captured from any surrounding/environment, and types of autonomous vehicles that are traveling within an environment, the system may identify if permanent data gathering devices/modules are to be installed around the roadside or temporary input data gathering module will be required dependent on the predicted vehicle actions. This may be performed using machine learning algorithms that analyze historical driving actions and/or historical sensor data used to make driving decisions and actions. By analyzing the historical decisions and data, the system may improve making decisions for requiring additional external data and/or deployment of permanent data collection models.

In some embodiments, the system may share data from autonomous vehicles with more sophisticated data collection sensors with other autonomous vehicles that have limited data collection sensors to improve the overall driving actions of the autonomous vehicles operating within an environment. For example, autonomous vehicles that have higher quality sensors and/or height resulting in improved visibility such as autonomous trucks, can provide their collected/analyzed data to other surrounding autonomous vehicles that may have limited sensors in order to enable the other vehicles to avoid obstacles or dangers that their sensors were unable to detect. In some embodiments, the sharing of encrypted data may be managed based on a subscription service. In some embodiments, the subscription service may be enabled via a cryptocurrency payment to a particular wallet address which would then provide a time-limited decryption key enabling the autonomous vehicle to leverage additional data for determining its own navigation and driving actions.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an example autonomous vehicle management system 100 in which illustrative embodiments of the present disclosure may be implemented. In the illustrated embodiment, the autonomous vehicle management system 100 includes autonomous vehicle manager 102 that is communicatively coupled to autonomous vehicle 120A, autonomous vehicle 120B, autonomous vehicle 120N (collectively referred to as autonomous vehicles 120), and data collection device 130 via network 150. In embodiments, autonomous vehicle manager 102, autonomous vehicles 120, and data collection device 130 may be configured as any type of computer system and may be substantially similar to computer system 401 of FIG. 4.

In embodiments, network 150 may be any type of communication network, such as a wireless network, edge computing network, autonomous vehicle network, a cloud computing network, temporal network, or any combination thereof (e.g., hybrid cloud network/environment). Consistent with various embodiments, a cloud computing environment may include a network-based, distributed data processing system that provides one or more edge/network/cloud computing services. Further, a cloud computing environment may include many computers (e.g., hundreds or thousands of computers or more) disposed within one or more data centers and configured to share resources over network 150. In some embodiments, network 150 may be substantially similar to computing environment 500 of FIG. 5.

In some embodiments, network 150 can be implemented using any number of any suitable communications media. For example, the network may be a wide area network (WAN), a local area network (LAN), temporal network, an internet, or an intranet. In certain embodiments, the various systems may be local to each other, and communicate via any appropriate local communication medium. For example, autonomous vehicle manager 102 may communicate with autonomous vehicles 120 and data collection device 130 using a WAN, one or more hardwire connections (e.g., an Ethernet cable), and/or wireless communication networks. In some embodiments, the various systems may be communicatively coupled using a combination of one or more networks and/or one or more local connections. For example, autonomous vehicle manager 102 may communicate with data collection device 130 through a hardwired connection, while communication between autonomous vehicles 120 may be through a wireless communication network.

In embodiments, autonomous vehicle manager 102 includes processor 106 and memory 108. The autonomous vehicle manager 102 may be configured to communicate with autonomous vehicles 120 and data collection device 130 through an internal or external network interface 104. The network interface 104 may be, e.g., a modem or a network interface card. The autonomous vehicle manager 102 may be equipped with a display or monitor. Additionally, the autonomous vehicle manager 102 may include optional input devices (e.g., a keyboard, mouse, scanner, or other input device), and/or any commercially available or custom software (e.g., browser software, communications software, server software, natural language processing/understanding software, search engine and/or web crawling software, filter modules for filtering content based upon predefined parameters, etc.).

In some embodiments, the autonomous vehicle manager 102 may include analysis component 110, digital twin generator 112, deployment component 114, and knowledge corpus 116. Analysis component 110 is configured analyze various types of external information related to operating the autonomous vehicles 120. The external information may include data 140 which may be collected from one or more sensors within an environment. The external information may include onboard data 124 collected from onboard sensors/devices of the autonomous vehicles 120. The analysis component 110 is configured to identify what types of data are necessary for performing vehicle actions 122 with respect to a defined contextual situation (e.g., based on contextual data associated with a given environment). For example, contextual data may include data from an air sensor that may identify the presence of smoke or smog in the air that may limit visibility for onboard vision systems. In another example, the external and/or contextual data may include visual data from an internet of things (IOT) camera indicating a traffic jam and/or an object in a roadway that may not be identified by the onboard vehicle systems of the autonomous vehicles 120. In embodiments, analysis component 110 may analyze the predicted response time for the autonomous vehicles 120 to perform driving actions 122 or driving decisions and determine, based on the external and/or contextual data, that there is a data insufficiency for making correct driving actions. In response to the data insufficiency, the autonomous vehicle manager 102 may deploy and/or initiate one or more data collection devices 130, external to the autonomous vehicles 120. The data collection device 130 is configured to collect additional data that can augment and/or mitigate any data insufficiency for making efficient driving actions in a safe manner.

In embodiments, digital twin generator 112 may generate a digital twin simulation used to predict the data insufficiency. The digital twin simulation may be a model of one or more autonomous vehicles 120, which incorporates aspects of the autonomous vehicles' physical state into a virtual world where it can be viewed and analyzed by the system to determine whether additional data is required for making driving decisions. For example, the digital twin generator 112 may construct a digital twin model of an autonomous vehicle in relation to one or more objects within a roadway. Using the digital twin model, the system may determine braking effectiveness and/or timing required to avoid hitting the object. However, if external conditions (based on weather data, other vehicle data, visibility data, etc.) may affect the determined driving actions, the autonomous vehicle manager 102 may use the digital twin modeling to determine what additional data may be necessary for the autonomous vehicles to make safer driving actions. Based on the modeling, the autonomous vehicle manager 102 may deploy or initiate additional data collection from data collection device 130.

For example, the data collection device 130 may capture visual data of unseen objects or roadway conditions that onboard cameras of the autonomous vehicles may not be able to view. In some embodiments, the autonomous vehicle manager 102 may determine what other types of autonomous vehicles 120 are operating in the environment and their data collection capabilities, and use this data to augment or mitigate any determined data insufficiency. For example, autonomous vehicle 120A may be a smaller vehicle that captures data 124A at a short distance, while autonomous vehicle 120B may be a large truck that has the capability to capture data 124B at a long distance when compared to autonomous vehicle 120A. Autonomous vehicle manager 102 may share data 124B with autonomous vehicle 120A in order to mitigate any data insufficiency of data 124A due its data collection range, allowing the autonomous vehicle 120A to make better driving decisions/actions. In another example, autonomous vehicle 120A may use camera based visual data to make driving actions 122A, while autonomous vehicle 120B may use radar based data for making driving actions 122B. The autonomous vehicle manager 102 may share data between the vehicles where any data insufficiency may be mitigated by the given data type. In this way, autonomous vehicles 120 may perform actions in a collaborative manner using more complete data sets.

Deployment component 114 utilizes the prediction of data insufficiency to deploy data collection device 130 for the autonomous vehicles 120. In embodiments, the data collection device 130 may be in the form of hardware or software. In some embodiments, the data collection device 130 may be deployed from the autonomous vehicle 120. In some embodiments, the data collection device 130 may be deployed from an alternative location (e.g., base station, roadway, second vehicle, etc.). In embodiments, the deployment component 114 will deploy the appropriate data collection device 130 based on the type of data insufficiency. For example, a LIDAR equipped unmanned aerial vehicle (UAV) may be deployed to supplement areas of poor visibility. In some embodiments, analysis component 110 will identify how the vehicles can be rearranged so that deployment of external data collection modules can be used in an optimum manner.

In embodiments, knowledge corpus 116 may be used to store, access, and/or update data for making autonomous vehicle decisions/actions based on collected external data and mitigated data insufficiencies from the deployment of data collection devices 130. In some embodiments, analysis component 110 may use machine learning algorithms to improve its data collection device 130 assignment capabilities automatically through experience and/or repetition without procedural programming. For example, the analysis component 110 may analyze historical driving actions 122 from the autonomous vehicles 120, determine the types of driving decisions that are made by autonomous vehicles while running on the road in different contextual situations, and determine over time what types additional external or contextual data are required for making better driving actions. Based on the identified types of additional data, the analysis component 110 may better predict the appropriate data collection device 130 to deploy when a data insufficiency is identified. In some embodiments, analysis component 110 may use machine learning to predict permanent locations along a travel route for areas where additional external data may continuously occur based on historically modified/mitigated driving actions.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

It is noted that FIG. 1 is intended to depict the representative major components of an exemplary autonomous vehicle management system 100. In some embodiments, however, individual components may have greater or lesser complexity than as represented in FIG. 1, components other than or in addition to those shown in FIG. 1 may be present, and the number, type, and configuration of such components may vary.

For example, while FIG. 1 illustrates an autonomous vehicle management system 100 with a single autonomous vehicle manager 102, three autonomous vehicles 120, a single data collection device 130, and a single network 150, suitable computing environments for implementing embodiments of this disclosure may include any number of autonomous vehicle management systems, autonomous vehicle managers, autonomous vehicles, data collection devices, and networks. The various modules, systems, and components illustrated in FIG. 1 may exist, if at all, across a plurality of autonomous vehicle management systems, autonomous vehicle managers, autonomous vehicles, data collection devices, and networks.

Figure 2:
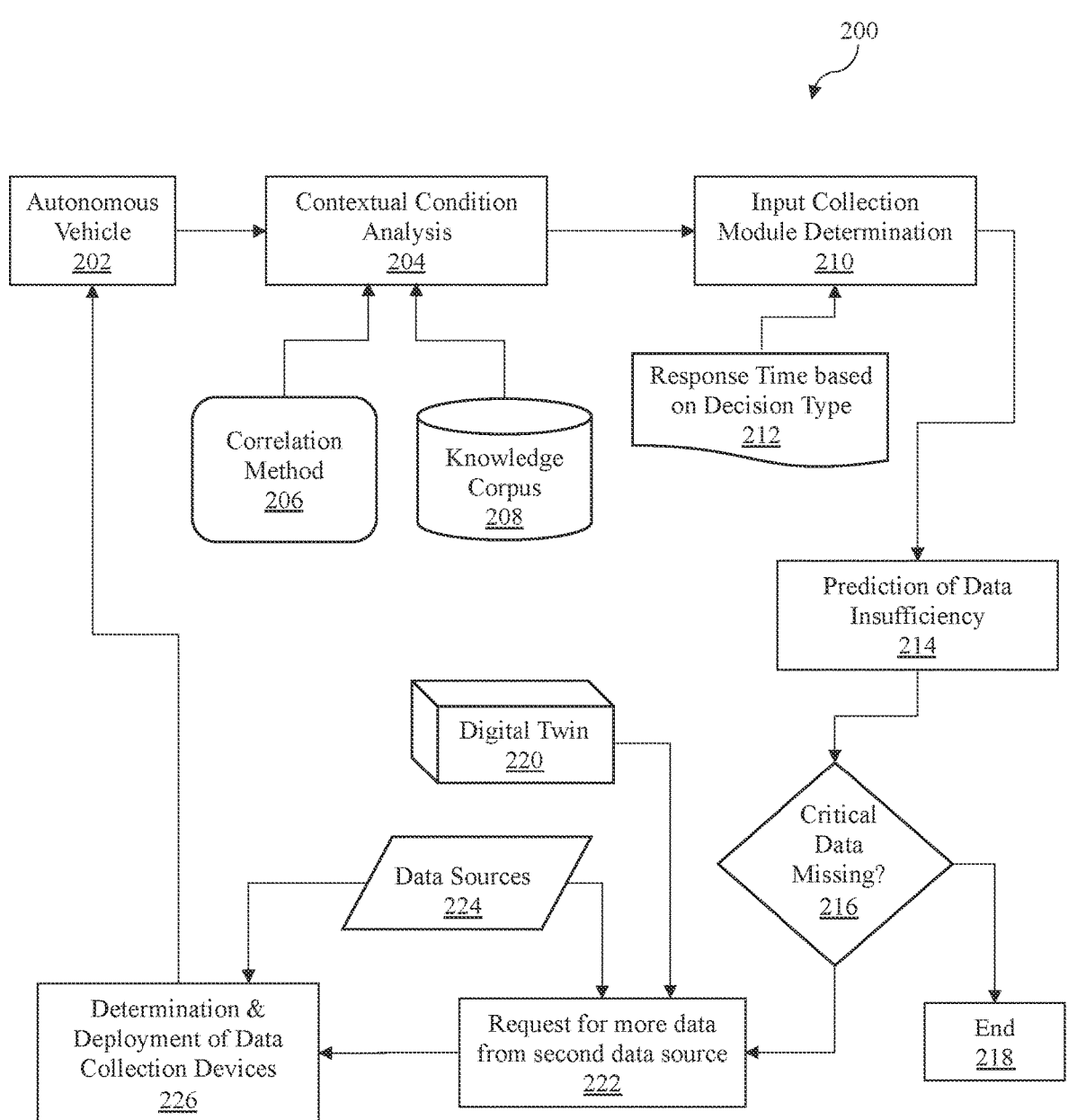
FIG. 2 illustrates an example diagram for predicting data insufficiency related to performing autonomous vehicle actions and dynamically mitigating the data insufficiency by collecting external data from additional data sources, in accordance with some embodiments of the present disclosure.

Referring now to FIG. 2, shown is an example diagram 200 for predicting data insufficiency related to performing autonomous vehicle actions and dynamically mitigating the data insufficiency by collecting external data from additional data sources, in accordance with some embodiments of the present disclosure. In the illustrated embodiment, autonomous vehicle manager 102 performs a contextual condition analysis 204 on data collected from autonomous vehicle 202 during operation of the vehicle in any type of contextual situation in an environment (e.g., driving on a roadway, flying in the air, moving through water, etc.). The autonomous vehicle manager 102 may utilize historic vehicle data to determine/identify what types of data should be analyzed by the vehicles to drive in a defined contextual situation. For example, the autonomous vehicle manager 102 may consider various contextual situations during driving and what types of data are considered for making actions in response to contextual situations such as identifying an object/animal on the roadway, bad weather conditions, smoke from a forest fire, limited visibility, etc. The autonomous vehicle manager 102 may analyze past driving decisions and/or actions and determine what types of ameliorative actions are taken by the vehicles in response to a given contextual situation (e.g., reducing speed, maneuvering around an object in the roadway, stopping etc.). The past driving decisions and historical data is obtained from knowledge corpus 208. In some embodiments, the autonomous vehicle manager 102 can also consider manual feeds about the contextual situation inputted by a user and types of data that will be required for vehicles to analyze. Using this data, the autonomous vehicle manager 102 may perform correlation method 206. The correlation method 206 may include processing data captured by autonomous vehicle 202, past decisions taken by autonomous vehicle 202 or other autonomous vehicles, and the contextual situation, to identify a correlation with the contextual situation, driving decision and the types of input data gathered. Correlation method 206 may include any suitable correlation processing method such as k Nearest Neighbor, k-Means, Apriori Algorithm, and the like.

In embodiments, the autonomous vehicle manager 102 may perform an input collection module determination 210 to determine if more data is needed to make an appropriate driving action based on the contextual situation. For example, based on the identified contextual situation, the autonomous vehicle manager 102 will consider the response time for the autonomous vehicle to perform the action or decision type 212, and validate the action by the comparing it with similar historical contextual situations. The proposed system will historically be gathering the types of driving decisions are taken by autonomous vehicles while running on the road for different contextual situations, and what types of input data are analyzed for the driving decision. Based on the identified types of input data to be analyzed, the autonomous vehicle manager 102 will identify what types of input/data collection modules/devices will be required.

In embodiments, the autonomous vehicle manager 102 may predict a data insufficiency 214 based on the contextual data and external data. If the predicted data insufficiency is not related to missing critical data 216, then the autonomous vehicle manager 102 may disregard the missing data and allow the autonomous vehicle 202 to perform a vehicle action without modification 218. If the predicted data insufficiency is related to critical data 216, then autonomous vehicle manager 102 may request or require more data from a second data source 222.

In embodiments, the autonomous vehicle manager 102 predicts the potential data insufficiency during the identified contextual situation and identifies the required data that is to be captured by the input collection modules to mitigate the data insufficiency. In some embodiments, autonomous vehicle manager may use a digital twin simulation 220 to predict the data insufficiency for performing the driving action. The digital twin simulation 220 may be used to predict how the autonomous vehicle 202 can make appropriate driving actions based on timing for executing actions in the given contextual situation. The digital twin simulation 220 may also be used to identify what types of vehicles or data sources 224 are running in the environment and what types of capabilities those data sources 224 have to capture input data. For example, a large truck will have the capability to capture data at a longer distance as compared to a small car, and some vehicles may use camera vision based systems while other use radar and LIDAR.

In embodiments, the autonomous vehicle manager 102 determines and deploys data collection devices 226 based on the required data inputs necessary to mitigate the data insufficiency. The data collection devices/modules can be in the form of hardware or software. In embodiments, the autonomous vehicle manager 102 may identify what types of input data collection modules are required for the autonomous vehicle 202 to make improved and/or more efficient driving actions. For example, an LIDAR equipped UAV may be used to supplement areas of poor visibility on a roadway which autonomous vehicle 202 is driving. In some embodiments, the autonomous vehicle manager 102 may use data collected from other autonomous vehicles to rearrange the vehicles in an optimum driving manner. For example, by using data collected from other vehicles, the autonomous vehicle manager 102 may reconfigure the vehicles in a manner that prevents running into one or more objects on a route and/or maintains an efficient speed in the event of one or more traffic events.

In embodiments, the autonomous vehicle manager 102 may identify appropriate positions in the surrounding/environment where data collection devices are to be deployed. For example, the autonomous vehicle manager 102 may determine that there is fog ahead on a highway and deploy one or more data collection devices to identify unforeseen objects at different locations along the road. The data collection devices will then send the collected data to the autonomous vehicle manager 102 such that any data insufficiency regarding visibility may be mitigated and the driving actions for autonomous vehicle 202 may be updated accordingly. In another example, the autonomous vehicle manager 102 may collect weather forecast and preemptively deploy various data collection devices according to the predicted weather. For example, bad weather conditions may be forecast for a busy intersection leading to high winds and possible flooding. Temporary ultraviolet lighting stations may be deployed/disposed alongside the intersection to allow autonomous vehicles to visualize the intersection in poor lighting conditions.

In some embodiments, the autonomous vehicle manager 102 may identify if an environment requires permanent placement of one or more data collection devices. For example, the autonomous vehicle manager 102 may be required to continuously deploy data collection devices for a specific type of contextual situation at a location in an environment. Because the additional external data continuously needs to be collected, the autonomous vehicle manager 102 may determine that permanent placement of collection devices may be necessary. A notification regarding the requirement of permanent data collection devices may be sent to one or more users (e.g., system administrators, managers, etc.) by the autonomous vehicle manager 102

Referring now to FIG. 3, shown is an example process 300 for predicting data insufficiency related to performing an action and dynamically mitigating the data insufficiency by collecting external data from a second data source, in accordance with some embodiments of the present disclosure. The process 300 may be performed by processing logic that comprises hardware (e.g., circuitry, dedicated logic, programmable logic, microcode, etc.), software (e.g., instructions run on a processor), firmware, or a combination thereof. In some embodiments, the process 300 is a computer-implemented process. In embodiments, the process 300 may be performed by processor 106 of autonomous vehicle manager 102 exemplified in FIG. 1.

In embodiments, the process 300 begins by directing, for an autonomous vehicle, an action in response to external data. This is illustrated at step 305. For example, the autonomous vehicle manager 102 may be directing an autonomous vehicle along a roadway at a certain speed and/or direction in response to various traffic situations/patterns.

The process 300 continues by collecting contextual data about an environment in which the autonomous vehicle is operating. This is illustrated at step 310. For example, the autonomous vehicle manager 102 may collect visual data from a computer vision camera disposed on the autonomous vehicle, where the autonomous vehicle makes driving decisions and actions based in part on the visual data. The visual data may indicate that there is smoke in the air causing poor visibility.

The process 300 continues by predicting, based in part on the collected contextual data, an insufficiency of external data for performing the action. This is illustrated at step 315. For example, because the visual data shows that there is smoke in the air causing poor visibility, the autonomous vehicle may not be able to make accurate driving decisions/actions using computer vision based on insufficient data regarding various unseen objects/vehicles in the road.

In some embodiments, predicting the insufficiency of external data for performing the action includes: analyzing the action to be performed in response to the external data and similar historical actions; correlating, based on the analyzing, the action with the contextual data about the environment that the autonomous vehicle is operating; generating, based on the correlating, a digital twin simulation of the autonomous vehicle performing the action; and determining, based on the digital twin simulation, that the action cannot be safely completed based on the available external data and contextual data. For example, the autonomous vehicle manager 102 may analyze the current action performed by the autonomous vehicle and historical autonomous vehicle actions with respect to similar contextual situations and generate a digital twin simulation that can be used to determine the outcome of the given action with respect to the current contextual situation. Using the digital twin simulation, the autonomous vehicle manager 102 may identify that there is a data insufficiency in the available external/contextual data.

The process 300 continues by directing, in response to the predicting, collection of additional external data from a second data source. This is illustrated at step 320. For example, the second data source may be configured as one or more data collection devices that is deployed from the autonomous vehicle to collect additional external data. In some embodiments, the second data source may be selected from the plurality of data sources consisting of: a laser imaging detection and ranging (LIDAR) device; a second autonomous vehicle; an external sensor disposed within the environment; an unmanned ground vehicle; and an unmanned aerial vehicle.

In embodiments, directing collection of additional external data from the second data source may include determining, based on the predicting, a type of data required for mitigating the insufficiency of external data; and identifying, based on the determined type of data, the second data source from a plurality of data sources. For example, an interstate highway may be heavily congested, while a platoon of autonomous trucks is travelling in formation to take advantage of the reduced wind resistance. The autonomous trucks may need to determine the location of other vehicles on the highway so that they can maintain their formation and keep the appropriate distance from one another (each truck in tandem). In response to the derived data insufficiency, a second autonomous vehicle equipped with a short-range network may broadcast its location to the platoon of autonomous trucks. Using the second autonomous vehicle's location, the platoon of autonomous trucks may modify driving actions with respect to the location of the second vehicle to maintain formation for reduced wind resistance.

In some embodiments, the process 300 continues by correlating the collected additional external data with the external data used to determine the action. This is illustrated at step 325.

In some embodiments, the process 300 continues by modifying, based on the correlating, the action to a second action, wherein the second action is different than the action. This is illustrated at step 330. For example, the autonomous vehicle manager 102 may modify an autonomous vehicle's driving action (e.g., speed, trajectory, etc.) to a second driving action (e.g., slower speed, different direction/trajectory) based on the additional collected data.

In some embodiments, the process 300 continues by directing the autonomous vehicle to perform the second action. This is illustrated at step 335. Returning to the poor visibility example from above, the autonomous vehicle manager 102 may cause the autonomous vehicle to change lanes based on collected data from a LIDAR sensor that indicates an object in the roadway that may not have been captured using onboard computer vision cameras. In some embodiments, the autonomous vehicle may share the additional external data from the second data source and/or the second action with a second autonomous vehicle, wherein the second autonomous vehicle modifies one or more actions based on the shared data. Returning to the previous example, the autonomous vehicle manager 102 may share the second action with another trailing autonomous vehicle, such that the trailing autonomous vehicle performs the same action to avoid the object in the roadway.

In some embodiments, the process 300 returns to step 305. In this way, the autonomous vehicle manager 102 continually monitors and assesses external data and contextual data related to the environment the autonomous vehicle is operating in to make informed vehicle action decisions.

Figure 4:
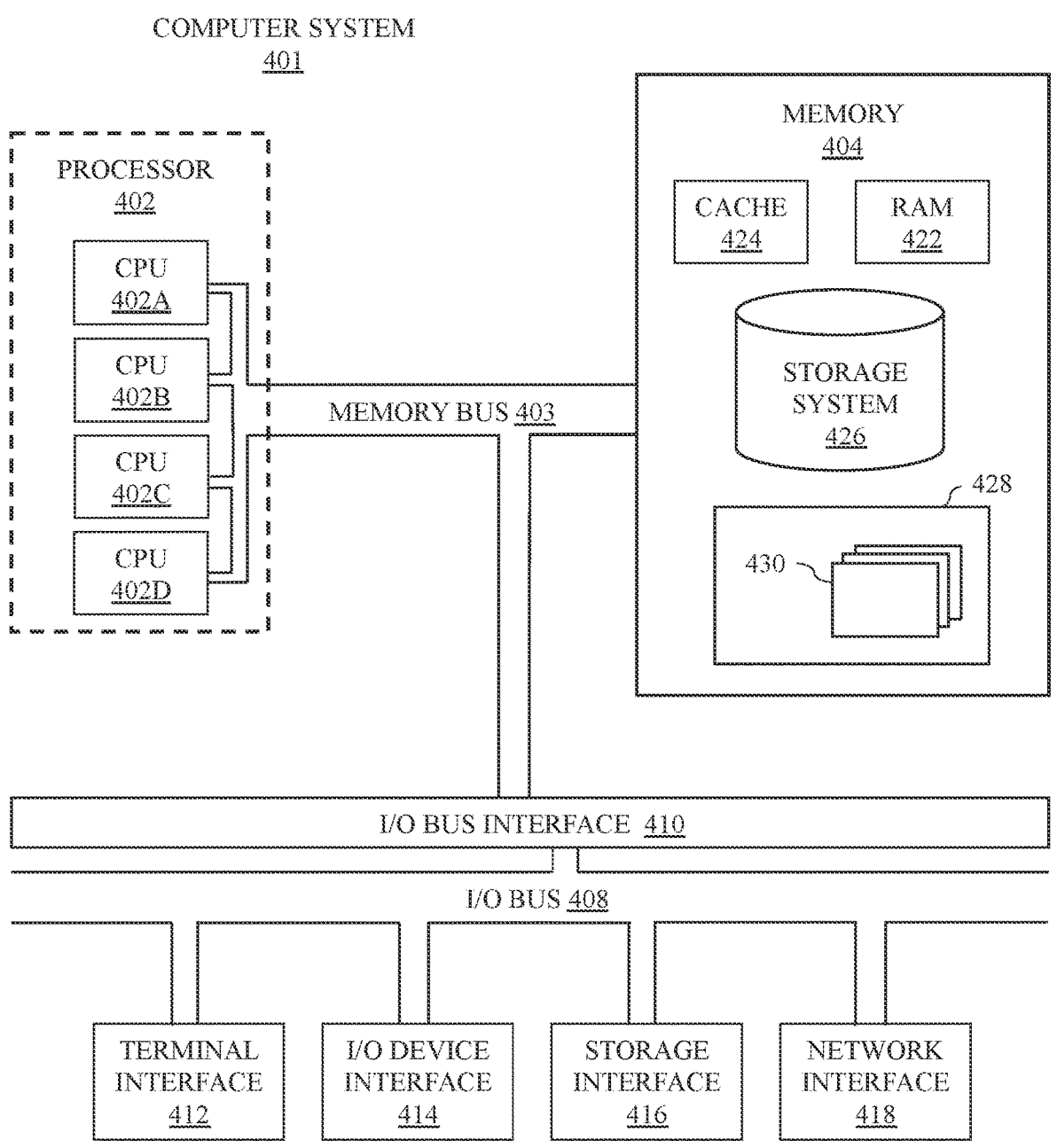
FIG. 4 illustrates a high-level block diagram of an example computer system that may be used in implementing one or more of the methods, tools, and modules, and any related functions, described herein, in accordance with embodiments of the present disclosure.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache. In some embodiments, a processor can include at least one or more of, a memory controller, and/or storage controller. In some embodiments, the CPU can execute the processes included herein (e.g., process 300 as described in FIG. 3). In some embodiments, the computer system 401 may be configured as autonomous vehicle management system 100 of FIG. 1.

System memory subsystem 404 may include computer system readable media in the form of volatile memory, such as random-access memory (RAM) 422 or cache memory 424. Computer system 401 may further include other removable/non-removable, volatile/non-volatile computer system data storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 404 can include flash memory, e.g., a flash memory stick drive or a flash drive. Memory devices can be connected to memory bus 403 by one or more data media interfaces. The memory subsystem 404 may include at least one program product having a set (e.g., at least one) of program modules that are configured to carry out the functions of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single units, the computer system 401 may, in some embodiments, contain multiple I/O bus interfaces 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory subsystem 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 428 and/or program modules 430 generally perform the functions or methodologies of various embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Embodiments of the present disclosure may be implemented together with virtually any type of computer, regardless of the platform is suitable for storing and/or executing program code. FIG. 5 shows, as an example, a computing environment 500 (e.g., cloud computing system) suitable for executing program code related to the methods disclosed herein and for circuit design automation. In some embodiments, the computing environment 500 may be the same as or an implementation of the computing environment 100.

Computing environment 500 contains an example of an environment for the execution of at least some of the computer code involved in performing the inventive methods, such as autonomous vehicle management code 600. The autonomous vehicle management code 600 may be a code-based implementation of the autonomous vehicle management system 100. In addition to autonomous vehicle management code 600, computing environment 500 includes, for example, a computer 501, a wide area network (WAN) 502, an end user device (EUD) 503, a remote server 504, a public cloud 505, and a private cloud 506. In this embodiment, the computer 501 includes a processor set 510 (including processing circuitry 520 and a cache 521), a communication fabric 511, a volatile memory 512, a persistent storage 513 (including operating a system 522 and the autonomous vehicle management code 600, as identified above), a peripheral device set 514 (including a user interface (UI)

device set 523, storage 524, and an Internet of Things (IOT) sensor set 525), and a network module 515. The remote server 504 includes a remote database 530. The public cloud 505 includes a gateway 540, a cloud orchestration module 541, a host physical machine set 542, a virtual machine set 543, and a container set 544.

The computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as the remote database 530. As is well understood in the art of computer technology, and depending upon the technology, performance of a computer-implemented method may be distributed among multiple computers and/or between multiple locations. On the other hand, in this presentation of the computing environment 500, detailed discussion is focused on a single computer, specifically the computer 501, to keep the presentation as simple as possible. The computer 501 may be located in a cloud, even though it is not shown in a cloud in FIG. 1. On the other hand, the computer 501 is not required to be in a cloud except to any extent as may be affirmatively indicated.

The processor set 510 includes one, or more, computer processors of any type now known or to be developed in the future. The processing circuitry 520 may be distributed over multiple packages, for example, multiple, coordinated integrated circuit chips. The processing circuitry 520 may implement multiple processor threads and/or multiple processor cores. The cache 521 is memory that is located in the processor chip package(s) and is typically used for data or code that should be available for rapid access by the threads or cores running on the processor set 510. Cache memories are typically organized into multiple levels depending upon relative proximity to the processing circuitry. Alternatively, some, or all, of the cache for the processor set may be located "off chip." In some computing environments, the processor set 510 may be designed for working with qubits and performing quantum computing.

Computer readable program instructions are typically loaded onto the computer 501 to cause a series of operational steps to be performed by the processor set 510 of the computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 521 and the other storage media discussed below. The program instructions, and associated data, are accessed by the processor set 510 to control and direct performance of the inventive methods. In the computing environment 500, at least some of the instructions for performing the inventive methods may be stored in the autonomous vehicle management code 600 in the persistent storage 513.

The communication fabric 511 is the signal conduction path that allows the various components of the computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

The volatile memory 512 is any type of volatile memory now known or to be developed in the future. Examples include dynamic type random access memory (RAM) or static type RAM. Typically, the volatile memory 512 is characterized by random access, but this is not required unless affirmatively indicated. In the computer 501, the volatile memory 512 is located in a single package and is internal to the computer 501, but, alternatively or additionally, the volatile memory may be distributed over multiple packages and/or located externally with respect to the computer 501.

The persistent storage 513 is any form of non-volatile storage for computers that is now known or to be developed in the future. The non-volatility of this storage means that the stored data is maintained regardless of whether power is being supplied to the computer 501 and/or directly to the persistent storage 513. The persistent storage 513 may be a read only memory (ROM), but typically at least a portion of the persistent storage allows writing of data, deletion of data and re-writing of data. Some familiar forms of persistent storage include magnetic disks and solid state storage devices. The operating system 522 may take several forms, such as various known proprietary operating systems or open source Portable Operating System Interface-type operating systems that employ a kernel. The code included in the autonomous vehicle management code 600 typically includes at least some of the computer code involved in performing the inventive methods.

The peripheral device set 514 includes the set of peripheral devices of the computer 501. Data communication connections between the peripheral devices and the other components of the computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 523 may include components such as a display screen, speaker, microphone, wearable devices (such as goggles and smart watches), keyboard, mouse, printer, touchpad, game controllers, and haptic devices. The storage 524 is external storage, such as an external hard drive, or insertable storage, such as an SD card. The storage 524 may be persistent and/or volatile. In some embodiments, the storage 524 may take the form of a quantum computing storage device for storing data in the form of qubits. In embodiments where the computer 501 is required to have a large amount of storage (for example, where the computer 501 locally stores and manages a large database) then this storage may be provided by peripheral storage devices designed for storing very large amounts of data, such as a storage area network (SAN) that is shared by multiple, geographically distributed computers. The IoT sensor set 525 is made up of sensors that can be used in Internet of Things applications. For example, one sensor may be a thermometer and another sensor may be a motion detector.

The network module 515 is the collection of computer software, hardware, and firmware that allows the computer 501 to communicate with other computers through the WAN 502. The network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of the network module 515 are performed on the same physical hardware device. In other embodiments (for example, embodiments that utilize software-defined networking (SDN)), the control functions and the forwarding functions of the network module 515 are performed on physically separate devices, such that the control functions manage several different network hardware devices. Computer readable program instructions for performing the inventive methods can typically be downloaded to the computer 501 from an external computer or external storage device through a network adapter card or network interface included in the network module 515.

The WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

The end user device (EUD) 503 is any computer system that is used and controlled by an end user (for example, a customer of an enterprise that operates the computer 501), and may take any of the forms discussed above in connection with the computer 501. The EUD 503 typically receives helpful and useful data from the operations of the computer 501. For example, in a hypothetical case where the computer 501 is designed to provide a recommendation to an end user, this recommendation would typically be communicated from the network module 515 of the computer 501 through the WAN 502 to the EUD 503. In this way, the EUD 503 can display, or otherwise present, the recommendation to an end user. In some embodiments, the EUD 503 may be a client device, such as thin client, heavy client, mainframe computer, desktop computer and so on.

The remote server 504 is any computer system that serves at least some data and/or functionality to the computer 501. The remote server 504 may be controlled and used by the same entity that operates computer 501. The remote server 504 represents the machine(s) that collect and store helpful and useful data for use by other computers, such as the computer 501. For example, in a hypothetical case where the computer 501 is designed and programmed to provide a recommendation based on historical data, then this historical data may be provided to the computer 501 from the remote database 530 of the remote server 504.

The public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of the public cloud 505 is performed by the computer hardware and/or software of the cloud orchestration module 541. The computing resources provided by the public cloud 505 are typically implemented by virtual computing environments that run on various computers making up the computers of the host physical machine set 542, which is the universe of physical computers in and/or available to the public cloud 505. The virtual computing environments (VCEs) typically take the form of virtual machines from the virtual machine set 543 and/or containers from the container set 544. It is understood that these VCEs may be stored as images and may be transferred among and between the various physical machine hosts, either as images or after instantiation of the VCE. The cloud orchestration module 541 manages the transfer and storage of images, deploys new instantiations of VCEs and manages active instantiations of VCE deployments. The gateway 540 is the collection of computer software, hardware, and firmware that allows the public cloud 505 to communicate through the WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 506 is similar to the public cloud 505, except that the computing resources are only available for use by a single enterprise. While the private cloud 506 is depicted as being in communication with the WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 505 and the private cloud 506 are both part of a larger hybrid cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

In some embodiments, one or more of the operating system 522 and the autonomous vehicle management code 600 may be implemented as service models. The service models may include software as a service (Saas), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
directing, for a first autonomous vehicle, an action in response to external data;
collecting contextual data about an environment in which the first autonomous vehicle is operating;
analyzing historical actions associated with prior similar contextual situations of the first autonomous vehicle;
correlating analysis of the historical actions with both the action and the collected contextual data;
predicting, based on the correlation, an insufficiency of the external data for performing the action; and
responsive to prediction of the insufficiency of the external data, directing the first autonomous vehicle to collect, from a second data source, additional external data to mitigate the insufficiency, wherein the second data source is a data collection device comprising a second autonomous vehicle, and wherein directing collection of the additional external data comprises deploying the second autonomous vehicle from a base station located on or within the first autonomous vehicle and receiving the additional external data from the second autonomous vehicle.

2. The computer-implemented method of claim 1, wherein predicting the insufficiency of the external data for performing the action comprises:

analyzing the action to be performed in response to the external data and similar historical actions;

correlating, based on the analyzing, the action with the contextual data about the environment that the first autonomous vehicle is operating;

generating, based on the correlating, a digital twin simulation of the first autonomous vehicle performing the action; and determining, based on the digital twin simulation, that the action cannot be safely completed based on the external data and contextual data.

3. The computer-implemented method of claim 1, wherein directing collection of additional external data from the second data source comprises:

determining, based on the predicting, a type of data required for mitigating the insufficiency of external data; and identifying, based on the determined type of data, the second data source from a plurality of data sources.

4. The computer-implemented method of claim 1, further comprising:

correlating the collected additional external data with the external data used to determine the action;

modifying, based on the correlating, the action to a second action, wherein the second action is different than the action; and directing the first autonomous vehicle to perform the second action.

5. The computer-implemented method of claim 4, further comprising:

sharing the additional external data from the second data source and/or the second action with a third autonomous vehicle, wherein the third autonomous vehicle modifies one or more actions based on the shared data.

6. A system comprising:

a processor; and a computer-readable storage medium communicatively coupled to the processor and storing program instructions which, when executed by the processor, cause the processor to perform a method comprising:

directing, for a first autonomous vehicle, an action in response to external data;

collecting contextual data about an environment in which the autonomous vehicle is operating;

analyzing historical actions associated with prior similar contextual situations of the first autonomous vehicle;

correlating analysis of the historical actions with both the action and the collected contextual data;

predicting, based on the correlation, an insufficiency of external data for performing the action; and responsive to prediction of the insufficiency of the external data, directing the first autonomous vehicle to collect, from a second data source, additional external data to mitigate the insufficiency, wherein the second data source is a data collection device comprising a second autonomous vehicle, and wherein directing collection of the additional external data comprises deploying the second autonomous vehicle from a base station located on or within the first autonomous vehicle and receiving the additional external data from the second autonomous vehicle.

7. The system of claim 6, wherein predicting the insufficiency of the external data for performing the action comprises:

analyzing the action to be performed in response to the external data and similar historical actions;

correlating, based on the analyzing, the action with the contextual data about the environment that the first autonomous vehicle is operating;

generating, based on the correlating, a digital twin simulation of the first autonomous vehicle performing the action; and determining, based on the digital twin simulation, that the action cannot be safely completed based on the external data and contextual data.

8. The system of claim 6, wherein directing collection of additional external data from the second data source comprises:

determining, based on the predicting, a type of data required for mitigating the insufficiency of external data; and identifying, based on the determined type of data, the second data source from a plurality of data sources.

9. The system of claim 6, wherein the method performed by the processor further comprises:

correlating the collected additional external data with the external data used to determine the action;

modifying, based on the correlating, the action to a second action, wherein the second action is different than the action; and directing the first autonomous vehicle to perform the second action.

10. The system of claim 9, wherein the method performed by the processor further comprises:

sharing the additional external data from the second data source and/or the second action with a third autonomous vehicle, wherein the third autonomous vehicle modifies one or more actions based on the shared data.

11. A computer program product comprising a computer-readable storage medium having program instructions embodied therewith, the program instructions executable by a processor to cause the processor to perform a method comprising:

directing, for a first autonomous vehicle, an action in response to external data;

collecting contextual data about an environment in which the first autonomous vehicle is operating;

analyzing historical actions associated with prior similar contextual situations of the first autonomous vehicle;

correlating analysis of the historical actions with both the action and the collected contextual data;

predicting, based on the correlation, an insufficiency of external data for performing the action; and responsive to prediction of the insufficiency of the external data, directing the first autonomous vehicle to collect, from a second data source, additional external data to mitigate the insufficiency, wherein the second data source is a data collection device comprising a second autonomous vehicle, and wherein directing collection of the additional external data comprises deploying the second autonomous vehicle from a base station located on or within the first autonomous vehicle and receiving the additional external data from the second autonomous vehicle.

12. The computer program product of claim 11, wherein predicting the insufficiency of the external data for performing the action comprises:

analyzing the action to be performed in response to the external data and similar historical actions;

correlating, based on the analyzing, the action with the contextual data about the environment that the first autonomous vehicle is operating;

generating, based on the correlating, a digital twin simulation of the first autonomous vehicle performing the action; and determining, based on the digital twin simulation, that the action cannot be safely completed based on the external data and contextual data.

13. The computer program product of claim 11, wherein directing collection of additional external data from the second data source comprises:

determining, based on the predicting, a type of data required for mitigating the insufficiency of external data; and identifying, based on the determined type of data, the second data source from a plurality of data sources.

14. The computer program product of claim 11, wherein the method performed by the processor further comprises:

correlating the collected additional external data with the external data used to determine the action;

modifying, based on the correlating, the action to a second action, wherein the second action is different than the action; and directing the first autonomous vehicle to perform the second action.

\* \* \* \* \*